United States Patent
Ozawa

(10) Patent No.: US 8,767,265 B2
(45) Date of Patent: Jul. 1, 2014

(54) IMAGE PROCESSING APPARATUS AND PROCESSING METHOD OF THE IMAGE PROCESSING APPARATUS

(75) Inventor: Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/450,086

(22) Filed: Apr. 18, 2012

(65) Prior Publication Data

US 2012/0287477 A1 Nov. 15, 2012

(30) Foreign Application Priority Data

May 13, 2011 (JP) .................................. 2011-108734
Apr. 9, 2012 (JP) .................................. 2012-088782

(51) Int. Cl.
*H04N 1/405* (2006.01)

(52) U.S. Cl.
USPC ........................................................ 358/3.13

(58) Field of Classification Search
None
See application file for complete search history.

(56) References Cited

U.S. PATENT DOCUMENTS

| 7,697,168 B2 * | 4/2010 | Ozawa et al. .................. 358/3.1 |
| 2007/0002065 A1 * | 1/2007 | Otake et al. .................. 345/581 |
| 2007/0154112 A1 * | 7/2007 | Tanaka .......................... 382/284 |
| 2009/0284801 A1 * | 11/2009 | Sakaue et al. ................ 358/3.27 |
| 2010/0092092 A1 * | 4/2010 | Sakaue .......................... 382/200 |
| 2010/0265549 A1 | 10/2010 | Kashibuchi et al. |

FOREIGN PATENT DOCUMENTS

JP 2010-252194 A 11/2010

* cited by examiner

*Primary Examiner* — Mark Zimmerman
*Assistant Examiner* — Michael Burleson
(74) *Attorney, Agent, or Firm* — Fitzpatrick, Cella, Harper & Scinto

(57) ABSTRACT

First intermediate data is generated from print data and character edge data serving as second intermediate data is generated by extracting edge sections of a character from the print data. A rendering process is applied to the first intermediate data and a dither matrix with a first number of lines is used to apply a pseudo halftone formation process to data after the rendering process to generate a first pseudo-halftone image. A rendering process is applied to the second intermediate data and a dither matrix with a second number of lines greater than the first number of lines is used to apply a pseudo halftone formation process to data after the rendering process to generate a second pseudo-halftone image. A pseudo-halftone image obtained by an OR operation of the first pseudo-halftone image and the second pseudo-halftone image is output.

10 Claims, 18 Drawing Sheets

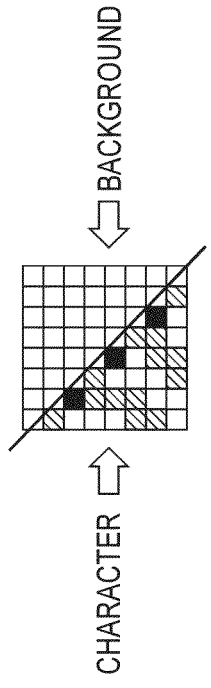
FIG. 4B
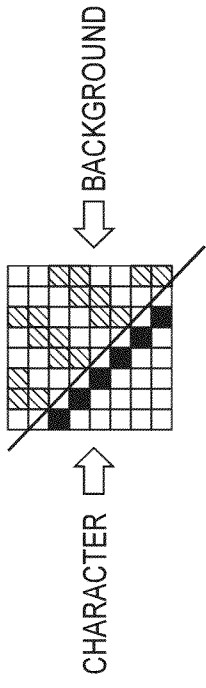
FIG. 4D
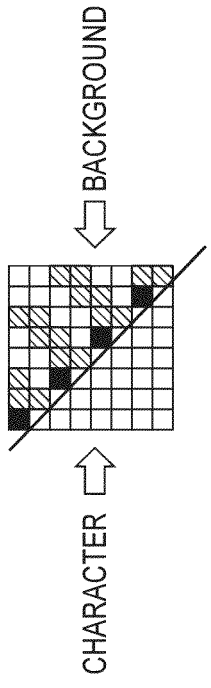
FIG. 4E
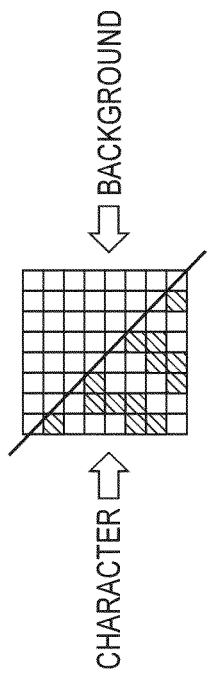
FIG. 4A
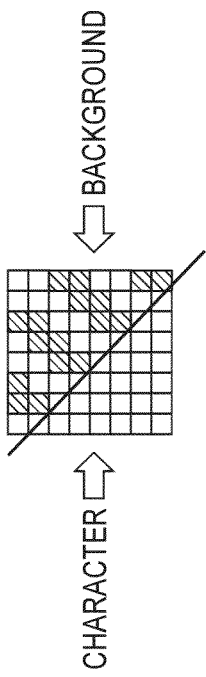
FIG. 4C

USER HIDES WHITE CHARACTER ON WHITE BACKGROUND

CHARACTER SHOWS UP WHEN EDGE CORRECTION PROCESS OF THE PRESENT INVENTION IS APPLIED

FOCUSING ON PIXELS, BACKGROUND IS WHITE

HALFTONE BACKGROUND

WHETHER BACKGROUND IS WHITE IS DETERMINED FROM SURFACE BACKGROUND CANNOT BE DETERMINED FROM POINTS BECAUSE BACKGROUND IS HALFTONE

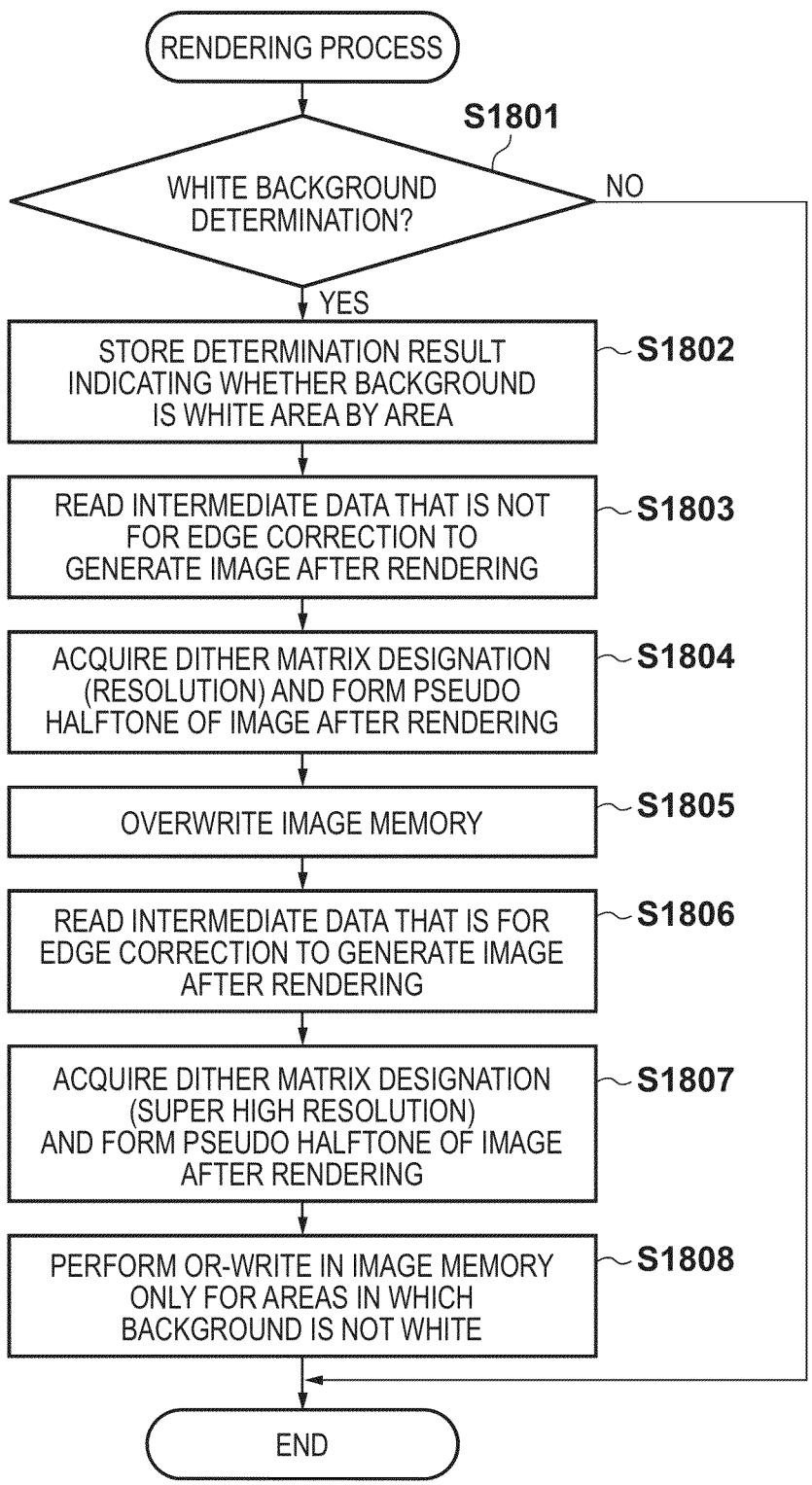

IMAGE PROCESSING APPARATUS AND PROCESSING METHOD OF THE IMAGE PROCESSING APPARATUS

BACKGROUND OF THE INVENTION

1. Field of the Invention

The present invention relates to an image processing apparatus and a processing method of the image processing apparatus.

2. Description of the Related Art

In an image forming apparatus that generates pseudo-halftone image data from PDL data or document data to print the image data, there is a technique of smoothly correcting jaggies at edge sections generated when the pseudo halftone is formed. An example of the technique of correction includes a technique of detecting edge sections to be corrected in pseudo-halftone image data and in attribute data describing attributes of pixels included in the image data to execute a correction process (Document 1: Japanese Patent Laid-Open No. 2010-252194).

However, the image data and the attribute data need to be created in Document 1, and a memory that stores the image data and the attribute data before the pseudo halftone formation is required.

SUMMARY OF THE INVENTION

The present invention provides an apparatus and a method for quickly suppressing jaggies caused by pseudo halftone formation with a memory-saving configuration, without generating attribute data.

An aspect of the present invention provides an image processing apparatus comprising: a generation unit that generates first intermediate data from print data and generating character edge data serving as second intermediate data by extracting edge sections of a character from the print data; a processing unit that applies a rendering process to the first intermediate data, applies a pseudo halftone formation process using a dither matrix with a first number of lines to data after the rendering process to generate a first pseudo-halftone image, applies a rendering process to the second intermediate data, and applies a pseudo halftone formation process using a dither matrix with a second number of lines greater than the first number of lines to data after the rendering process to generate a second pseudo-halftone image; and an output unit that outputs a pseudo-halftone image obtained by an OR operation of the first pseudo-halftone image and the second pseudo-halftone image.

Further features of the present invention will become apparent from the following description of exemplary embodiments (with reference to the attached drawings).

BRIEF DESCRIPTION OF THE DRAWINGS

FIGS. 4A to 4E are diagrams showing examples of edge correction results according to the present embodiment;

FIG. 18 is a flow chart showing a white background determination process.

DESCRIPTION OF THE EMBODIMENTS

Hereinafter, embodiments for carrying out the invention will be described in detail with reference to the drawings. The present embodiments describe an example of an image forming apparatus that generates pseudo-halftone image data from print data (PDL data or character data included in a document) to print the data.

The present embodiments focus on character data with the most notable jaggies at edge sections of the image when a pseudo halftone is formed. A technique for smoothly correcting the edges without generating attribute data has the following configuration.

More specifically, edge sections are extracted from print data to internally generate character edge data. A dither matrix with an arbitrary number of lines is used to form a pseudo halftone of the character data and render the character data. A dither matrix with more number of lines than the dither matrix used to form the pseudo halftone of the character data is used to form a pseudo halftone of the character edge data sections to overwrite or merge (OR write) the sections and render the data. As a result, the edge sections of the rendered character are rimmed, and the jaggies at the edge sections can be suppressed.

[First Embodiment]

Figure 1:
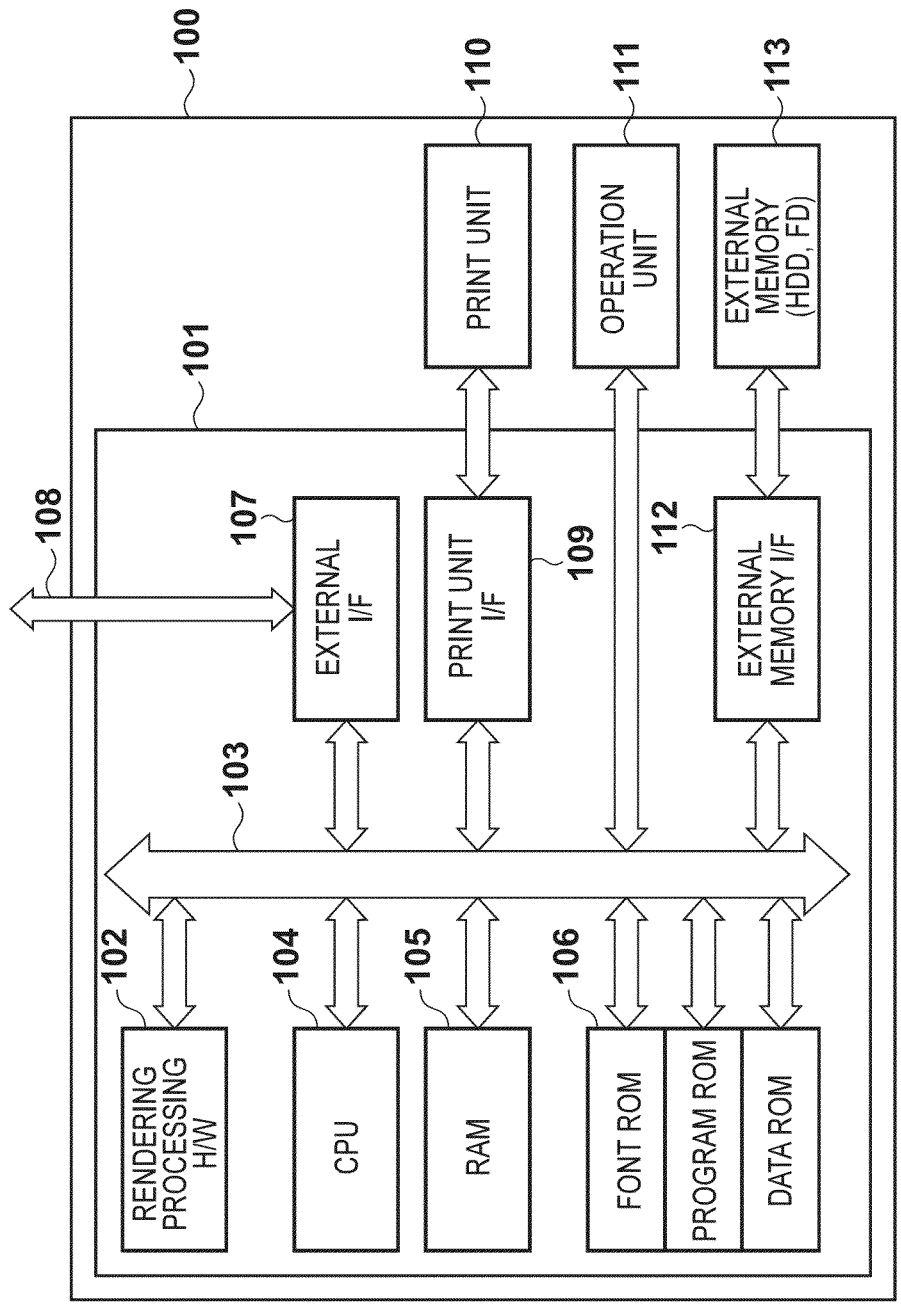
FIG. 1 is a diagram showing a configuration of an image forming apparatus according to a first embodiment.

A configuration of the image forming apparatus according to a first embodiment will be described with reference to FIG. 1. An image forming apparatus 100 includes a controller 101 that controls the entire apparatus. A CPU 104 is mounted on the controller 101. The CPU 104 outputs an image signal serving as output information to a print unit (printer engine) 110 through a system bus 103 based on a control program, etc. The control program is stored in a program ROM of a ROM 106, an external memory 113, etc.

The control program of the CPU 104, etc., are stored in the program ROM of the ROM 106, and font data used to generate an image signal serving as output information, etc., are stored in a font ROM. The ROM 106 further includes a data ROM that stores initial values necessary for operations of various programs. The CPU 104 is configured to be able to receive PDL data from a host computer, etc., through an external I/F 107. A RAM 105 is a memory that functions as a main memory, a work area, etc., of the CPU 104, and an option RAM connected to an expansion port not shown can extend the memory capacity. The RAM 105 is used as a load area of intermediate data and image data, a storage area of printer mode setting information, etc.

A memory controller (MC) 112 controls access by an external memory 113 such as a hard disk (HD) and an IC card. The controller 101 may also include rendering processing H/W 102. The controller 101 can cause the rendering processing H/W 102 to execute part of a process executed by the CPU 104 after reception of PDL data to execute the process fast. The external memory 113 is connected as an option and stores font data, an emulation program, form data, etc.

A switch for operation, an LED display, etc., are disposed on an operation unit 111. The number of external memories is not limited to one, and at least one or more external memories may be included. A plurality of external memories storing embedded fonts, option font cards, programs for interpreting printer control languages of different language systems may be able to be connected. An NVRAM not shown may also be included to store printer mode setting information from the operation unit 111.

Figure 2:
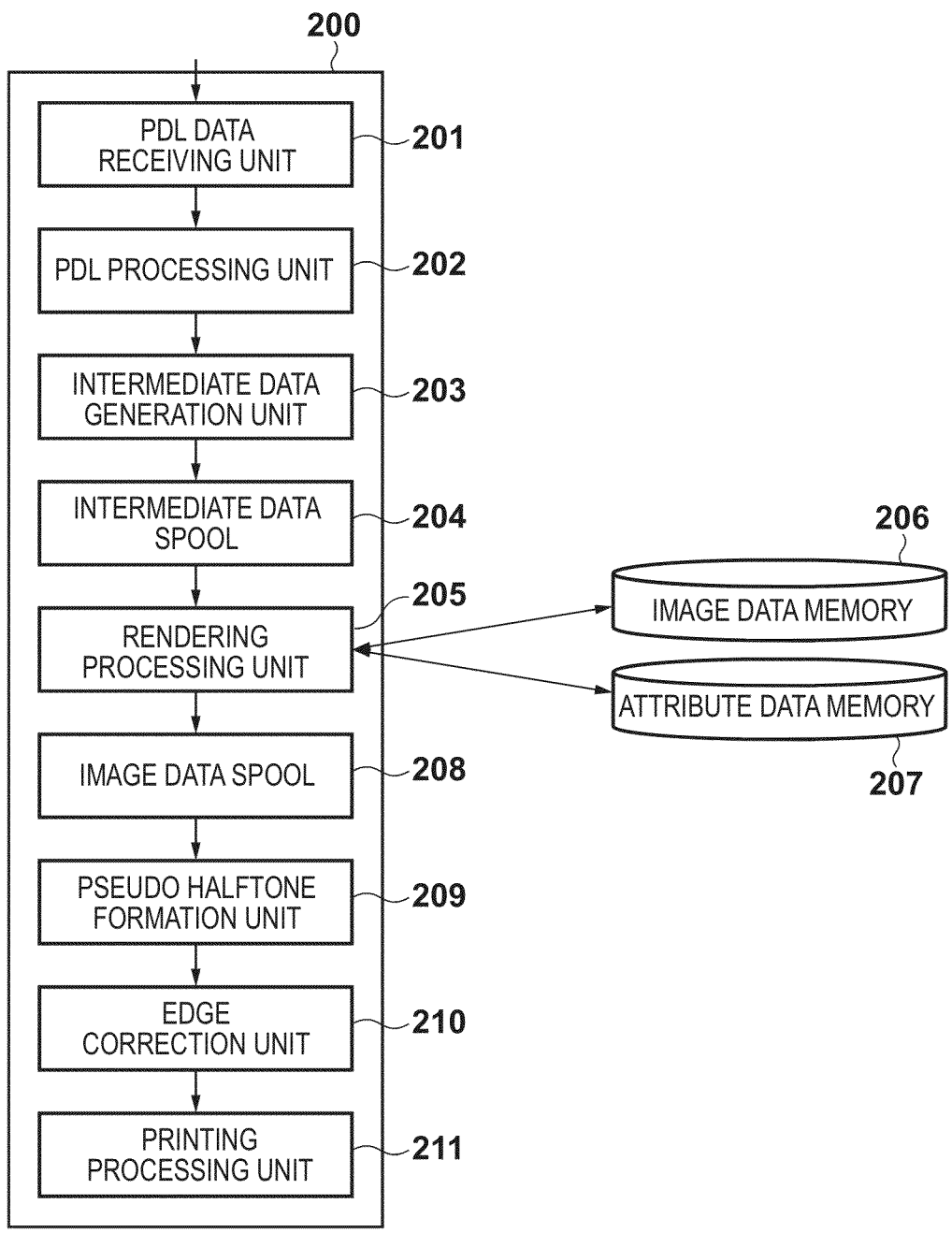
FIG. 2 is a diagram showing a configuration of a typical image processing unit.

A typical configuration of an image processing unit 200 that corrects jaggies at edge sections of pseudo-halftone image data will be described with reference to FIG. 2. The image processing unit 200 includes a PDL data receiving unit 201, a PDL processing unit 202, an intermediate data generation unit 203, a rendering processing unit 205, a pseudo halftone formation unit 209, an edge correction unit 210, and a printing processing unit 211. Programs of the processing units are stored in the program ROM of the ROM 106. The programs are loaded on the RAM 105 from the program ROM of the ROM 106 prior to execution, and the CPU 104 executes the programs. Other than the program ROM of the ROM 106, the programs may be stored in an HDD of the external memory 113, etc., and provided.

An intermediate data spool 204, an image data memory 206, an attribute data memory 207, and an image data spool 208 are work areas secured in the RAM 105 and are used to temporarily store intermediate data and image data.

The PDL data receiving unit 201 receives PDL data from the outside through a network. The received PDL data is transmitted to the PDL processing unit 202, and PDL interpretive information with interpreted PDL data is transmitted to the intermediate data generation unit 203. The intermediate data generation unit 203 stores intermediate data in the intermediate data spool 204 based on the PDL interpretive information transmitted from the PDL processing unit 202. When the intermediate data of one page is stored in the intermediate data spool 204, the rendering processing unit 205 reads the intermediate data from the intermediate data spool 204 and executes a rendering process. Image data and attribute data of one page are created in the image data memory 206 and the attribute data memory 207 as a result of the rendering process by the rendering processing unit 205. The rendering processing unit 205 reads the image data and the attribute data of one page from the image data memory 206 and the attribute data memory 207 and stores the data in the image data spool 208.

In this case, the data is compressed and stored in the image data spooler 208. Uncompressed memory areas are just for one page of the image data memory 206 and the attribute data memory 207, and data of other pages is compressed and stored in the image data spool 208. Therefore, an image forming apparatus with a small memory capacity can be created. The image data and the attribute data stored in the image data spool 208 are transmitted to the pseudo halftone formation unit 209, and pseudo-halftone image data and attribute data are transmitted to the edge correction unit 210. The edge correction unit 210 extracts edge sections from the attribute data and applies a correction process to the edge sections of the pseudo-halftone image data to suppress jaggies. The pseudo-halftone, edge-corrected image data is transmitted to the printing processing unit 211 and printed.

According to the typical configuration, the image data and the attribute data need to be created, and the process takes much time. The data size of the image data without the pseudo halftone is greater than the data size of the pseudo-halftone image, and the manufacturing cost increases due to an increase in the memory capacity. If the data transfer speed of the system bus 103 or the data storage speed of the RAM 105 is slow, the processing speed is reduced due to an increase in the data size.

Figure 3:
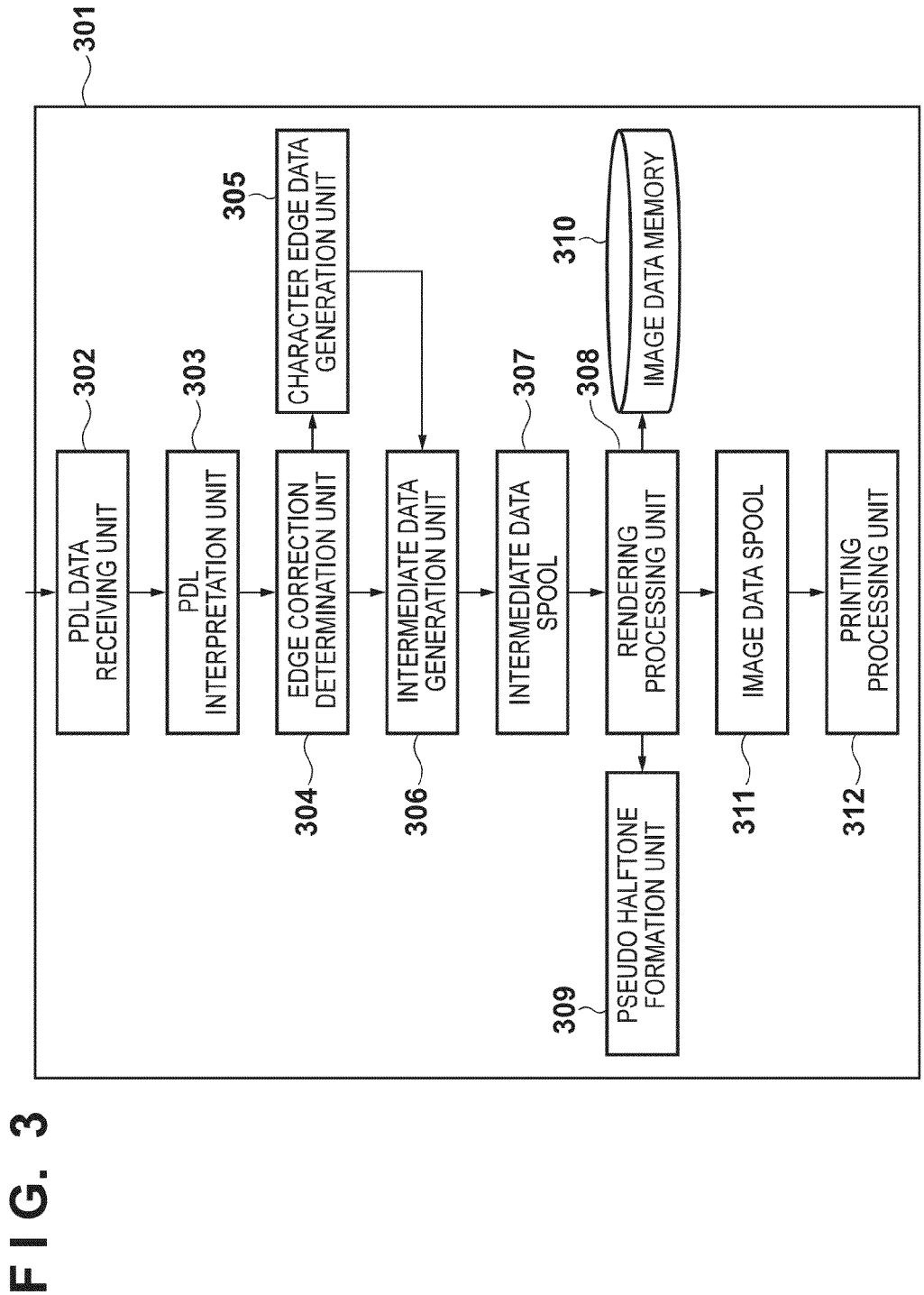
FIG. 3 is a diagram showing a configuration of an image processing unit according to the present embodiment.

A process of correcting jaggies at edge sections of pseudo-halftone image data according to the present embodiment will be described with reference to FIG. 3. A PDL data receiving unit 302 of an image processing unit 301 receives PDL data through a network. The received PDL data is transmitted to a PDL interpretation unit 303, and PDL interpretive information is transmitted to an edge correction determination unit 304 before being transmitted to an intermediate data generation unit 306. The edge correction determination unit 304 determines whether to correct the edges based on the PDL interpretive information and determines a correction method.

Regardless of whether the edges are corrected, the edge correction determination unit 304 transmits the PDL interpretive information transmitted from the PDL interpretation unit 303 to the intermediate data generation unit 306. The intermediate data generation unit 306 creates intermediate data (for example, a display list) and stores the intermediate data in an intermediate data spool 307. If the edge correction determination unit 304 determines that the edges need to be corrected, the edge correction determination unit 304 transmits the determination result to the character edge data generation unit 305. The character edge data generation unit 305 creates data for edge correction and transmits the data to the intermediate data generation unit 306. The intermediate data generation unit 306 outputs intermediate data for edge correction (for example, a display list) to the intermediate data spool 307. When the intermediate data of one page is output to the intermediate data spool 307, a rendering processing unit 308 reads the intermediate data and executes a rendering process. A pseudo halftone formation unit 309 forms a pseudo halftone of the rendered result and writes the result in an image data memory 310. The rendering processing unit 308 also reads intermediate data for edge correction generated in the intermediate data to execute the rendering process. Therefore, edge-corrected image data is generated in the image data memory 310.

When the rendering processing unit 308 generates image data of one page in the image data memory 310, the image data is stored in an image data spool 311. At this point, the image data can be compressed and stored to reduce the memory capacity. The data stored in the image data spool 311 is transmitted to a printing processing unit 312 and printed. According to the configuration, there is no need to create attribute data. Therefore, the processing is reduced, and fast processing can be realized. Since only pseudo-halftone image data is handled, the data size is small. The processing speed does not slow down even if the data transfer speed of the system bus 103 or the data storage speed of the RAM 105 is slow.

FIGS. 4A to 4E are diagrams showing examples of edge correction results obtained by an edge correction process according to the present invention. If the density of the character data is high as in FIG. 4A, pixels are added inside the character in the edge correction process as in FIG. 4B to suppress jaggies. However, if the density of the character data is low as in FIG. 4C, jaggies are not suppressed if pixels are added inside of the character in the edge correction process as in FIG. 4D, and it looks as if dirt is added to the character. Therefore, if the density of the character is low as in FIG. 4C, the correction result pursued by the present invention is adding pixels to the outside of the character in the edge correction process as in FIG. 4E.

Figure 5:
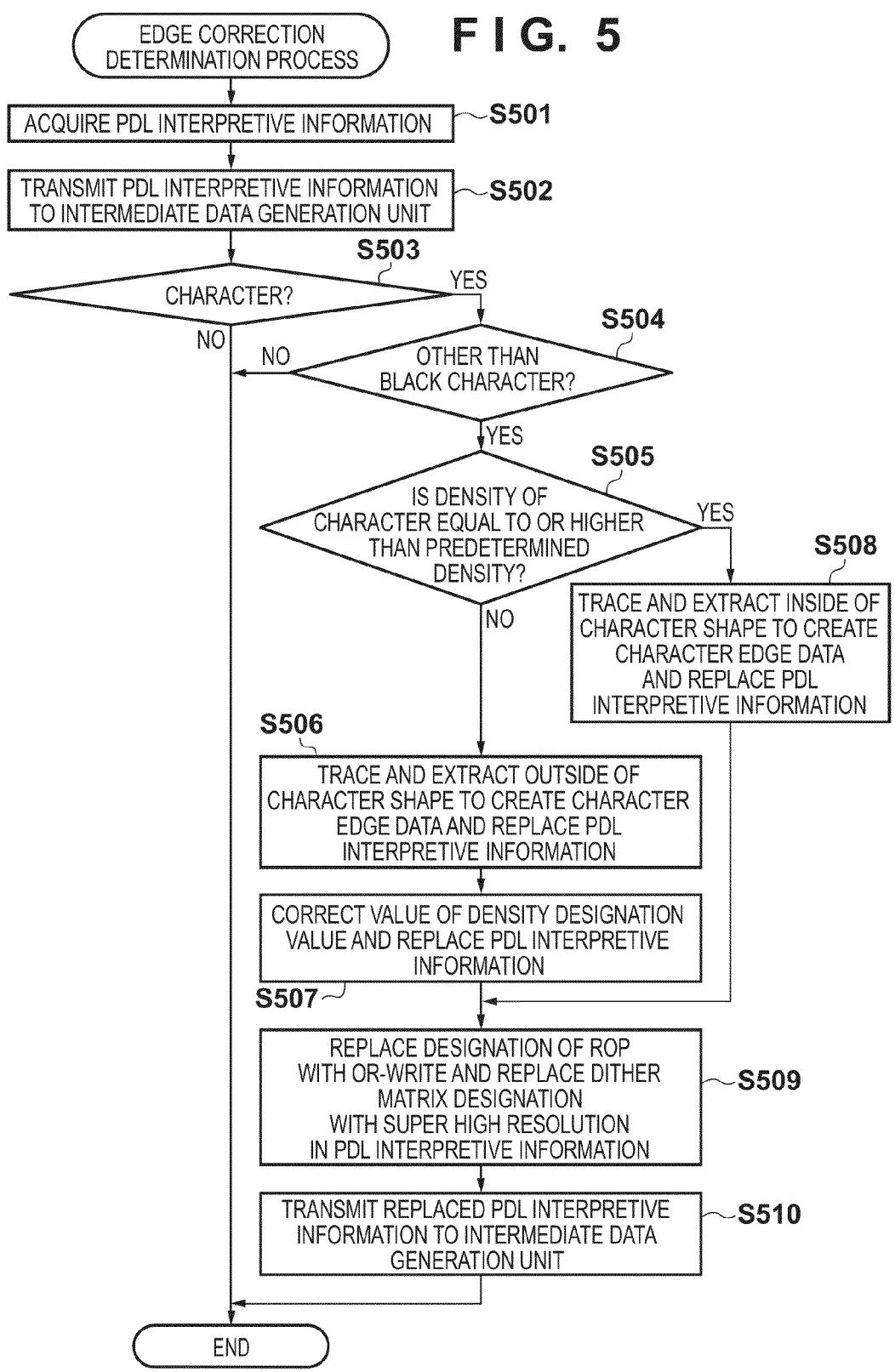
FIG. 5 is a flow chart showing an intermediate data generation process for edge correction.

To realize the process described in FIGS. 4A to 4E, an intermediate data generation process for edge correction executed by the edge correction determination unit 304 and the character edge data generation unit 305 will be described with reference to FIG. 5.

A program of the edge correction determination unit 304 and the character edge data generation unit 305 is stored in the RAM 105 or the external memory 113. The program is loaded on the RAM 105 upon execution, and the CPU 104 executes the program.

Figure 6:
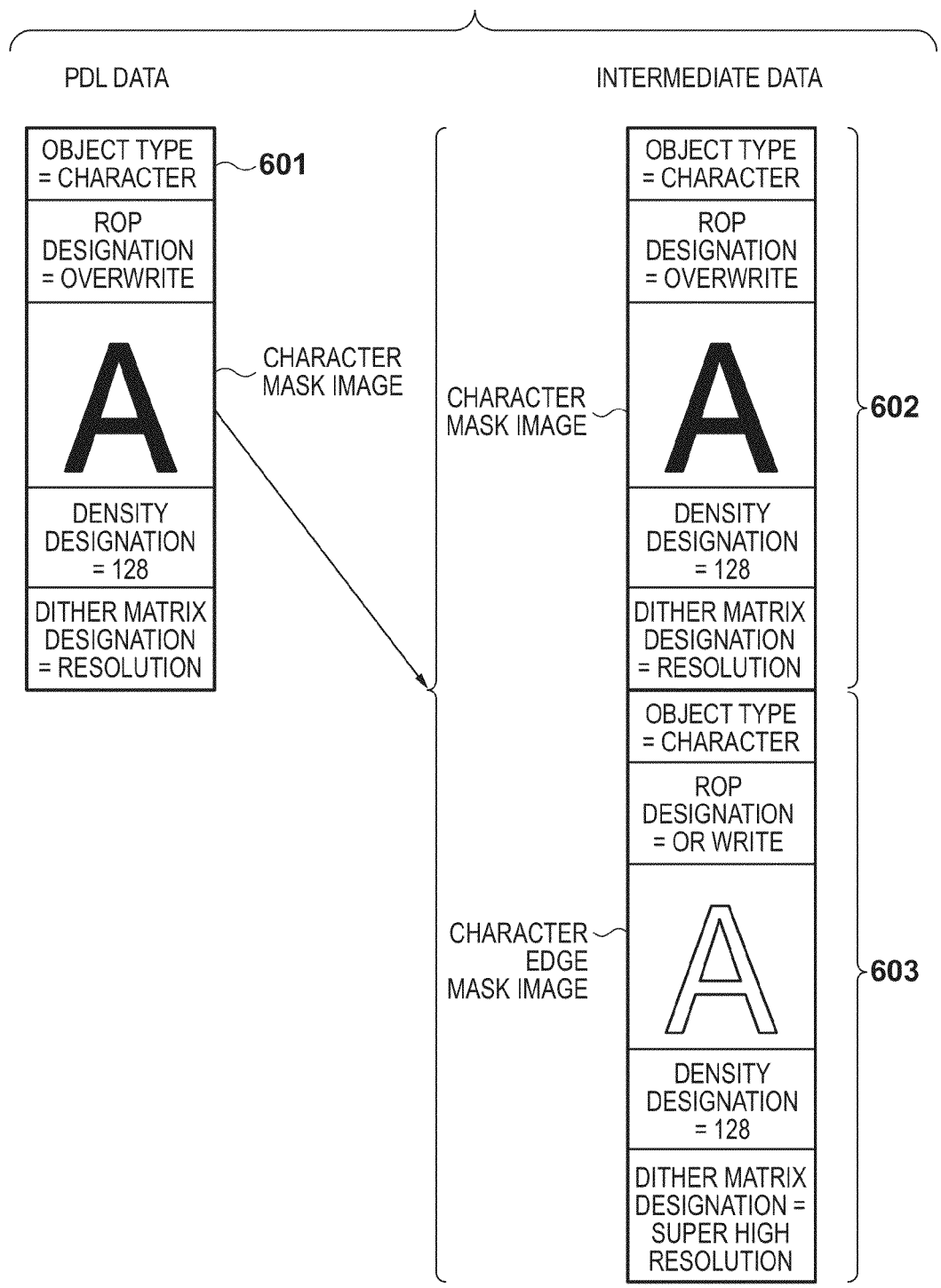
FIG. 6 is a diagram showing an example of PDL data and intermediate data.

FIG. 6 is a diagram showing an example of PDL data and intermediate data according to the present embodiment. Although one object is illustrated as PDL data 601 here, a plurality of objects are actually included. In S501, the edge correction determination unit 304 receives the PDL interpretive information from the PDL interpretation unit 303. Specifically, this is a process of receiving an object type, an ROP designation, a character mask image, a density designation, and a dither designation included in the PDL data 601. In S502, the edge correction determination unit 304 transmits the PDL interpretive information to the intermediate data generation unit 306 to generate intermediate data, regardless of the content of the PDL interpretive information. The intermediate data generated here is intermediate data 602 (first intermediate data) shown in FIG. 6, and the content is the same as that of the PDL data 601.

In S503, the edge correction determination unit 304 refers to the object type in the PDL interpretive information and determines whether the object type is a character. If the object type is not a character as a result of the determination, the edge correction determination unit 304 ends the process. If the object type is a character, the edge correction determination unit 304 advances the process to S504 and determines whether the character is not a black character. If the density designation of the PDL interpretive information is black (density is 256 tones, and density designation is 255), jaggies are not generated at edge sections even if a pseudo halftone is formed. Therefore, the edge correction determination unit 304 determines not to execute the correction process and ends the process.

Meanwhile, if the density designation of the PDL interpretive information is not black (density is 256 tones, and density designation is not 255), the edge correction determination unit 304 determines that the edge correction is necessary and advances the process to S505 to determine an edge correction method. In S505, the edge correction determination unit 304 acquires a density value from the density designation of the PDL interpretive information. The edge correction determination unit 304 determines that the character is dark if the density of the character is equal to or greater than a threshold (equal to or greater than a predetermined density) and determines that the character is light if the density of the character is smaller than the threshold. An initial value of the threshold is stored in the data ROM of the ROM 106, and the edge correction determination unit 304 can read the initial value to obtain the threshold. The threshold may be an arbitrary value, and the user may be able to rewrite the threshold from the operation unit 111.

In the example, the threshold is copied from the data ROM of the ROM 106 to the RAM 105 upon activation of the image forming apparatus. The edge correction determination unit 304 is configured to refer to the value of the RAM 105, and the threshold in the RAM 105 can be rewritten from the operation unit 111 to set an arbitrary threshold to the edge correction determination unit 304. Threshold rewrite information may be added to the PDL data, and the PDL interpretation unit 303 may rewrite the threshold in the RAM 105.

Figure 8:
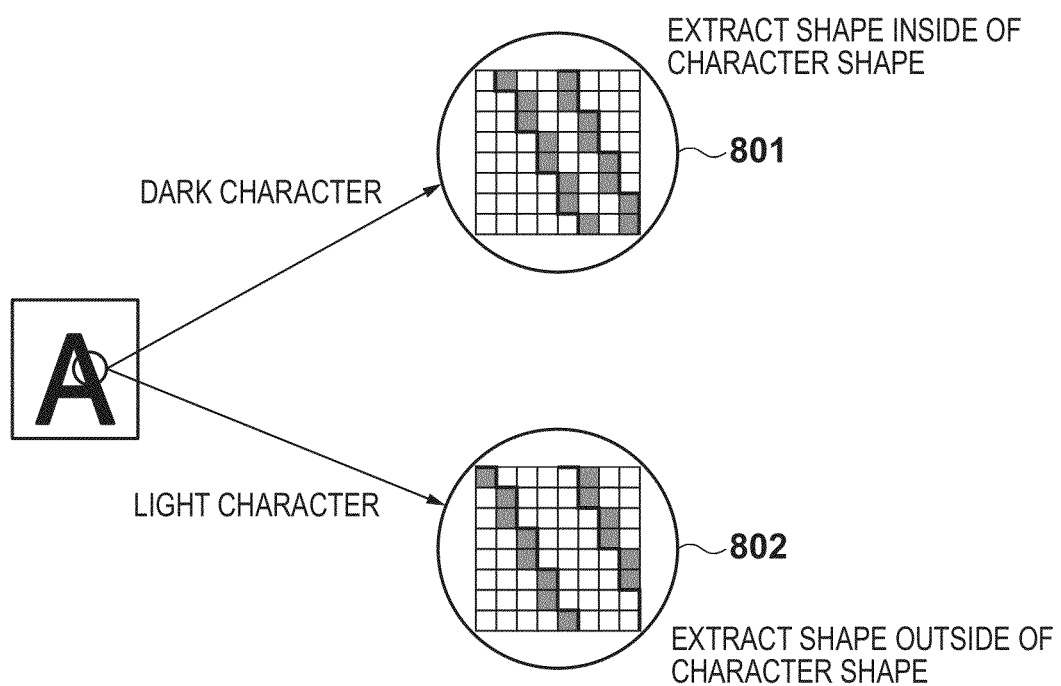
FIG. 8 is a diagram showing an example of extracting a shape inside or outside of a character shape.

In S505, if it is determined that the density is low, the process proceeds to S506. The PDL interpretive information is transmitted from the edge correction determination unit 304 to the character edge data generation unit 305, and PDL interpretive information for edge correction is generated. More specifically, the character edge data generation unit 305 extracts the shape outside the character from a character mask image included in the PDL interpretive information to generate a character edge mask image. The character edge data generation unit 305 replaces the character mask image included in the PDL interpretive information with the created character edge mask image. The character edge data generated by extracting the shape outside of the character denotes a mask image formed by extracting only pixel sections adjacent to the outside of the character shape as shown by reference numeral 802 of FIG. 8.

Figure 7:
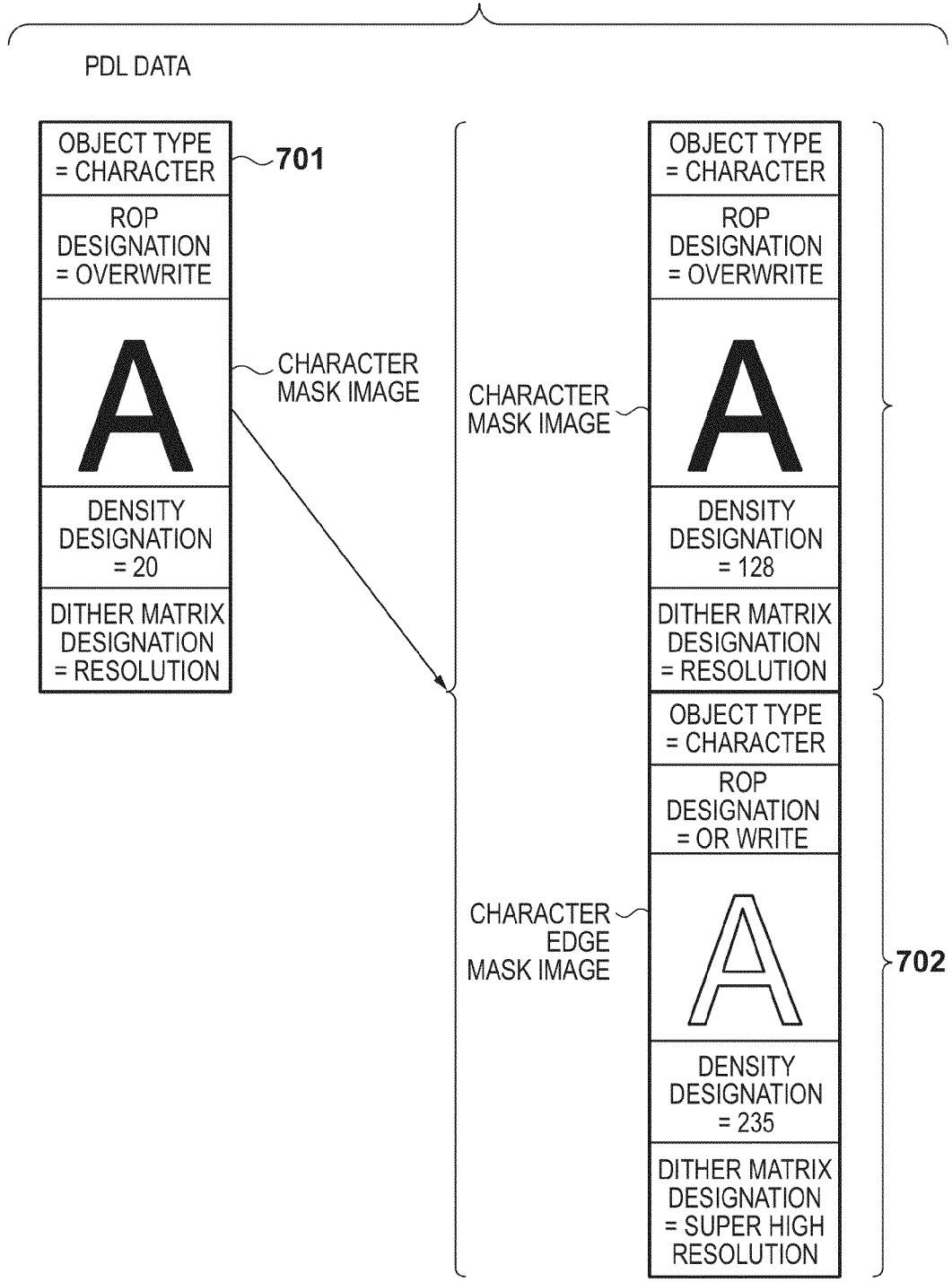
FIG. 7 is a diagram showing intermediate data in which a density designation value of PDL data is corrected.
Figure 12:
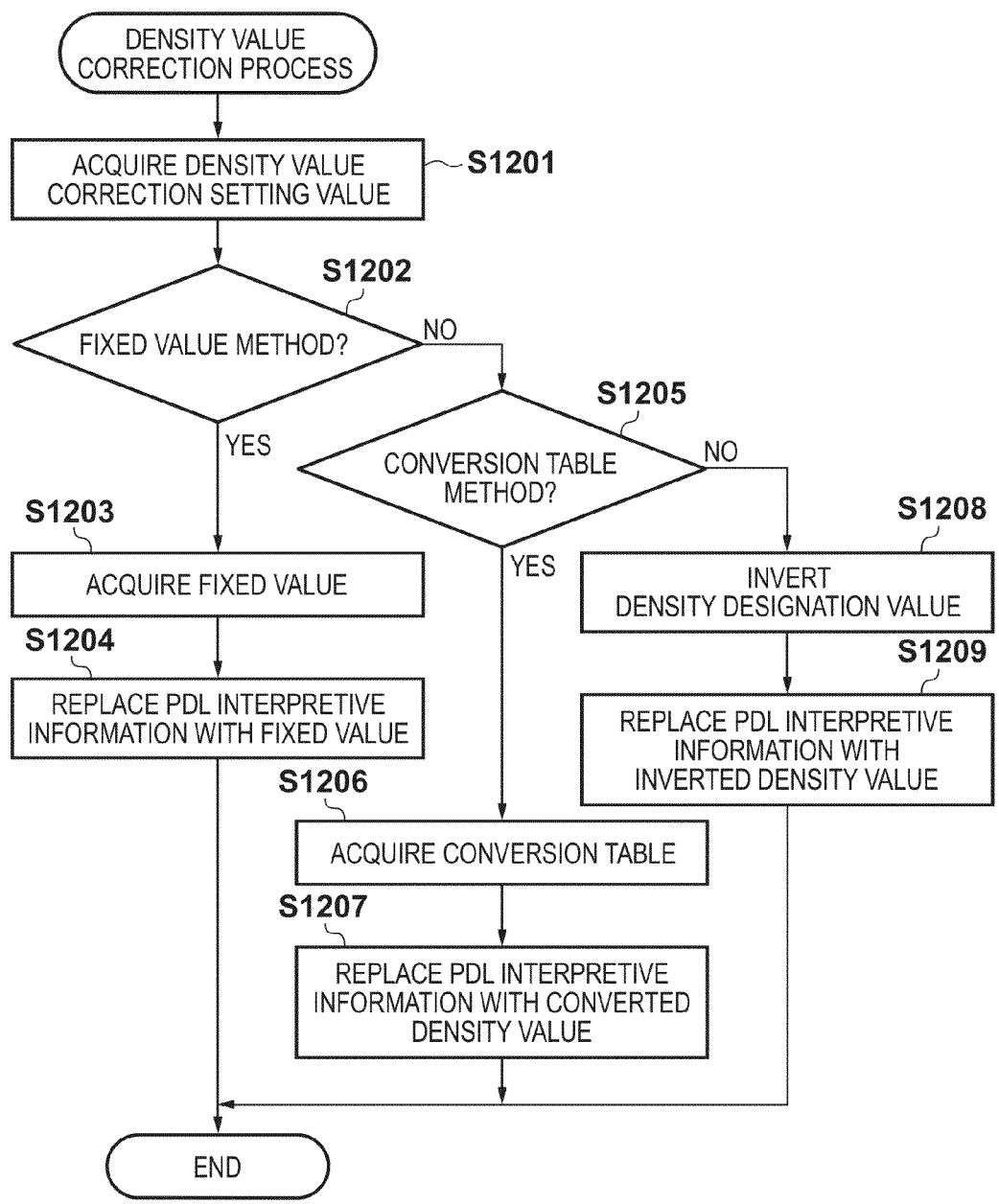
FIG. 12 is a flow chart showing a correction process of the density designation value.

In S507, the character edge data generation unit 305 corrects the value of the density designation value included in the PDL interpretive information and replaces the PDL interpretive information. The reason that the density designation value is corrected is that even if a pseudo halftone is formed while the density is low in order to rim the edge sections, only few pixels become on-bit (pixels with density higher than the threshold described in the dither matrix) when the pseudo halftone is formed, and this is not effective. Examples of the method of correcting the density designation value include a method of inverting the original designation value and a method of setting a fixed value. Although the detailed description related to the correction process of the density designation value will be described later with reference to FIG. 12, FIG. 7 shows an example of inverting and replacing the density designation. When 20 (density 256 tones) is designated for the density designation value of PDL data 701 shown in FIG. 7, 235 is set to the density setting value of the edge correction data of intermediate data 702.

On the other hand, if it is determined that the density is high in S505, the process proceeds to S508. The character edge data generation unit 305 extracts the shape inside of the character from the character mask image included in the PDL interpretive information to generate a character edge mask image. The character edge data generation unit 305 replaces the character mask image included in the PDL interpretive information with the created character edge mask image. The character edge data generated by extracting the shape inside of the character denotes a mask image formed by extracting only pixel sections adjacent to the inside of the character shape as shown by reference numeral 801 of FIG. 8.

In S509, regardless of the determination result of the correction method, the character edge data generation unit 305 sets OR write to the ROP designation of the PDL interpretive information and replaces the dither matrix designation with a dither matrix designation (dither with super high number of lines) with a higher number of lines (second number of lines). In S510, the character edge data generation unit 305 transmits the replaced PDL interpretive information to the intermediate data generation unit 306 to generate intermediate data for edge correction in the intermediate data spool 307. The generated intermediate data is the intermediate data shown in FIG. 6 (second intermediate data) and is generated as edge correction data from the PDL data 601 based on the process by the character edge data generation unit 305 from S506 to S510.

Figure 9:
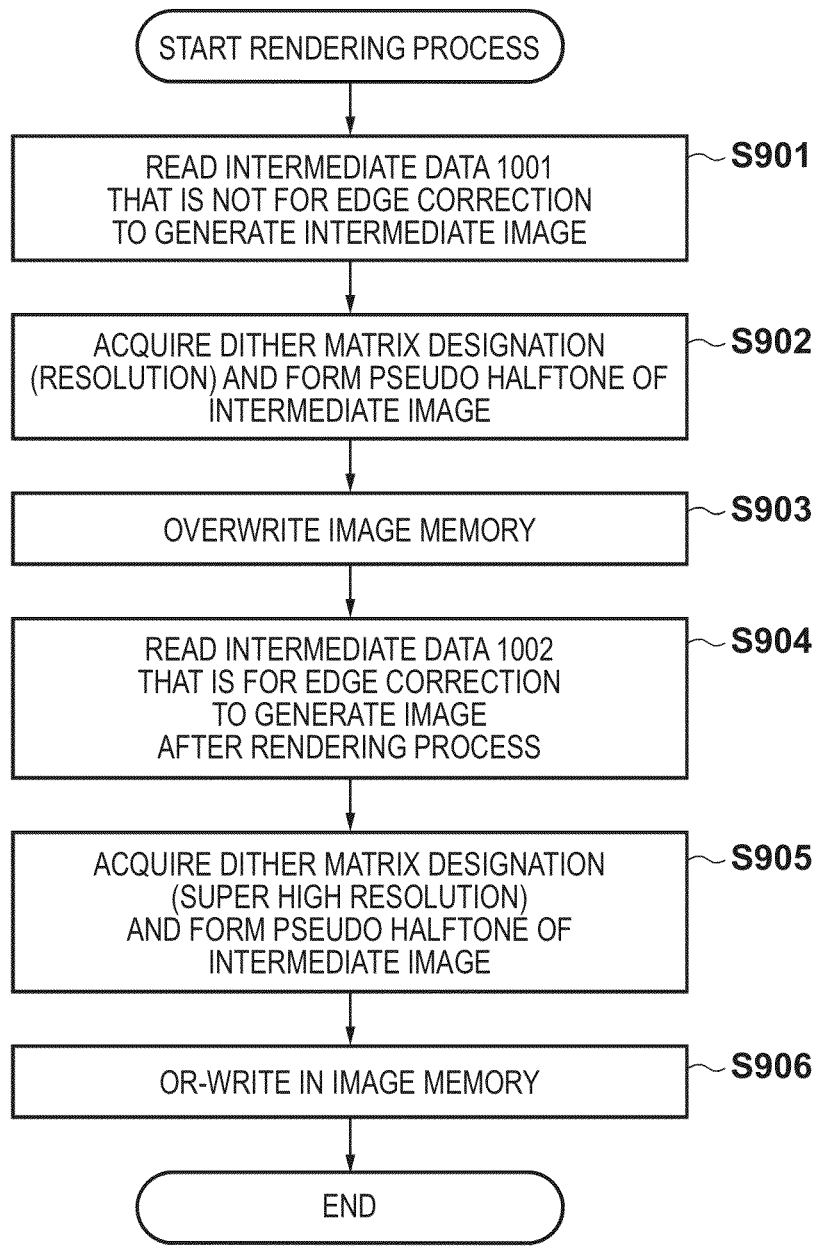
FIG. 9 is a flow chart showing a rendering process according to the present embodiment.

A process in which the rendering processing unit 308 and the pseudo halftone formation unit 309 apply a rendering process to the intermediate data, which includes the intermediate data for edge correction described with reference to FIG. 5, to rim the edge sections of the character to generate image data with suppressed jaggies will be described with reference to FIG. 9.

A program of the rendering processing unit 308 and the pseudo halftone formation unit 309 is stored in the RAM 105 or the external memory 113. The program is loaded on the RAM 105 upon execution, and the CPU 104 executes the program. If the rendering processing H/W 102 that executes the process is included, the rendering processing H/W 102 may execute the process.

Figure 10:
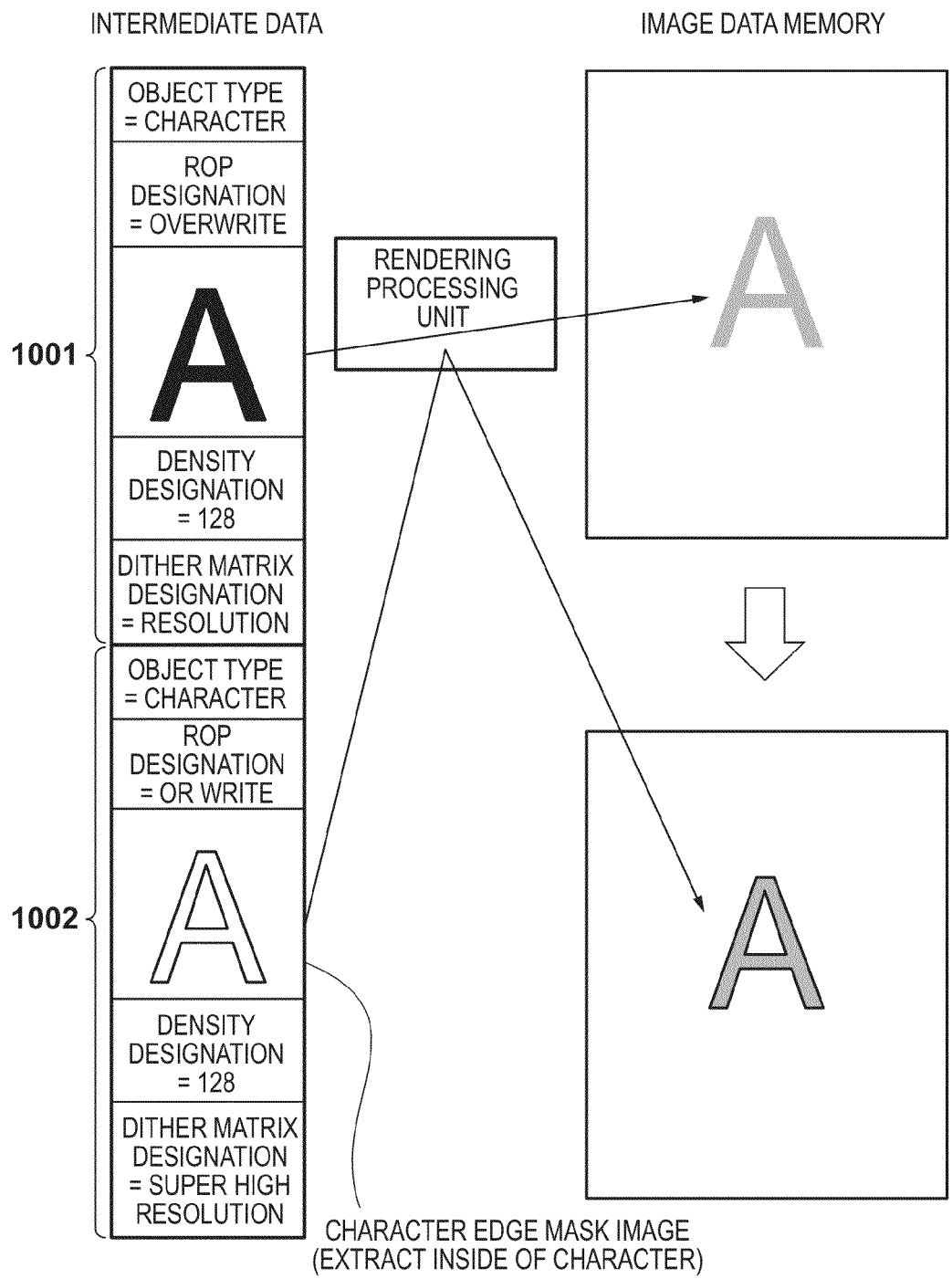
FIG. 10 is a diagram of overwriting an image data memory with intermediate data when the density of the character is high.

Since the original intermediate data that is not for the edge correction and the intermediate data that is for the edge correction are generated in the intermediate data spool 307, the rendering processing unit 308 just needs to sequentially read the data to execute the rendering process. Intermediate data 1001 shown in FIG. 10 is original intermediate data that is not for edge correction, and intermediate data 1002 is intermediate data for edge correction. The intermediate data 1001 and the intermediate data 1002 are stored in the intermediate data spool 307.

In S901, the rendering processing unit 308 reads the character mask image from the original intermediate data 1001 that is not for the edge correction and generates an image after the rendering process (for example, a bitmap image). In S902, the rendering processing unit 308 transmits the image after the rendering process to the pseudo halftone formation unit 309, and the pseudo halftone formation unit 309 forms a pseudo halftone of the image after the rendering process and returns the pseudo-halftone image to the rendering processing unit 308. In this case, the pseudo halftone formation unit 309 refers to the dither matrix designation of the intermediate data 1001 and uses a dither matrix with a low number of lines (first number of lines) (resolution) to form a pseudo halftone. In S903, the rendering processing unit 308 overwrites the image data memory 310 with the pseudo-halftone image formed in S902.

In S904, the rendering processing unit 308 reads the character edge mask image (edges inside of the character) from the intermediate data for edge correction and generates an image after the rendering process (for example, a bitmap image). In S905, the rendering processing unit 308 transmits the image after the rendering process to the pseudo halftone formation unit 309, and the pseudo halftone formation unit 309 forms a pseudo halftone of the image after the rendering process and returns the pseudo-halftone image to the rendering processing unit 308. In this case, the pseudo halftone formation unit 309 refers to the dither matrix designation of the intermediate data 1001 and uses a dither matrix with a high number of lines (second number of lines) (super high resolution) to form the pseudo halftone. The second number of lines is greater than the first number of lines. In S906, the rendering processing unit 308 performs OR (logical sum) writing (overwriting) of the pseudo-halftone image formed in S905 in the image data memory 310 (storage unit).

Figure 11:
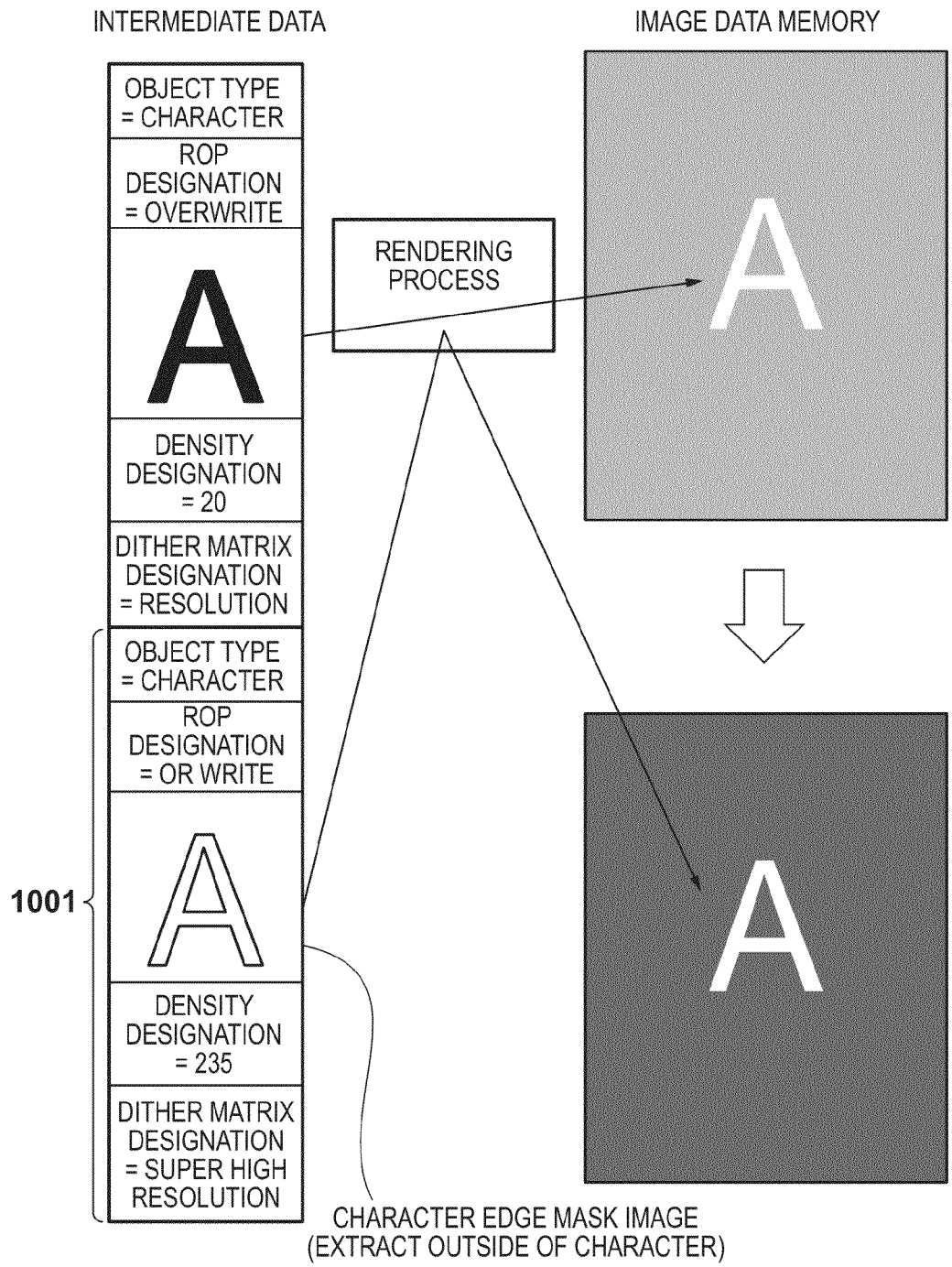
FIG. 11 is a diagram of overwriting the image data memory with intermediate data when the density of the character is low.

According to the process, the jaggies at the edge sections, which are generated when the pseudo halftone of the entire character is formed by the dither matrix with the low number of lines to render the character, are OR-written with the result obtained by forming the pseudo halftone of only the edge sections inside the character based on the dither matrix with the high number of lines. As a result, jaggies at the edge sections can be suppressed. The data obtained by performing an OR operation of the pseudo-halftone image generated in S902 and the pseudo-halftone image generated in S905 may be output and stored in the image data memory 310, without executing the process of S903 and S906. Alternatively, the data obtained by performing an OR operation of the pseudo-halftone image generated in S902 and the pseudo-halftone image generated in S905 may be output to the intermediate data spool 311. Although the example shown in FIG. 10 illustrates intermediate data when the density of the character is high, a similar process can also be performed when the density of the character is low as shown in FIG. 11. In the case of the intermediate data shown in FIG. 11, the character edge mask image (included in the intermediate data 1101) is obtained by the rendering processing unit 308 extracting the edge sections outside of the character in S904, and the edge sections outside of the character are rimmed.

Details of the process of correcting the density designation value executed by the character edge data generation unit 305 in S507 shown in FIG. 5 will be described with reference to FIG. 12. The program of the character edge data generation unit 305 is stored in the RAM 105 or the external memory 113. The program is loaded on the RAM 105 upon execution, and the CPU 104 executes the program.

In S1201, the character edge data generation unit 305 acquires a setting value indicating by which processing method the density correction method will be performed (setting value for correcting the density value). Initial values of information related to the setting value for correcting the density value are stored in the ROM 106, and the initial values are stored in the RAM 105 upon activation. After the activation, the setting value for correcting the density value is changed by the operation unit 111, or setting change data is received through the external I/F 107 to change the setting value. The information related to the setting value for correcting the density value denotes a setting value for correcting the density value indicating the correction method, a density value in a fixed value method, and a conversion table. In the example, the types of the setting value for correcting the density value include the fixed value method, a conversion table method, and a density value inversion method. In S1201, the character edge data generation unit 305 acquires the setting value for correcting the density value stored in the RAM 105.

In S1202, the character edge data generation unit 305 determines whether the setting value acquired in S1201 indicates the fixed value method. If the setting value indicates the fixed value method as a result of the determination, the process proceeds to S1203, and the density value in the fixed value method is acquired from the RAM 105. In S1204, the character edge data generation unit 305 replaces the density value designation of the PDL interpretive information with the density value acquired in S1203.

On the other hand, if the setting value does not indicate the fixed value method in S1202, the process proceeds to S1205, and the character edge data generation unit 305 determines whether the density correction setting acquired in S1201 indicates the table conversion method. If the density correction setting indicates the table conversion method as a result of the determination, the process proceeds to S1206, and the conversion table is acquired from the RAM 105. In S1207, the character edge data generation unit 305 acquires the density value of the density value designation included in the PDL interpretive information and converts the density value based on the conversion table to replace the density designation of the PDL interpretive information with the converted density value.

If the density correction setting does not indicate the conversion table method in S1205, the process proceeds to S1208. If the density correction setting acquired in S1201 indicates the inversion system, the character edge data generation unit 305 acquires the density value of the density value designation included in the PDL interpretive information. In the following S1209, the character edge data generation unit 305 replaces the density value designation of the PDL interpretive information with the inverted density value.

In this way, the density correction method is switched, because there is a problem that it looks as if the image quality is degraded when the edge sections of the character are corrected, depending on the type of the data or preference of the user. The problem can be solved by enabling to change the density correction method depending on the type of the data and preference of the user. The process shown in FIG. 3 allows applying the present invention to the configuration of creating the image data and the attribute data shown in FIG. 2. In that case, information that allows recognizing the determination of whether the data is a character needs to be added to the attribute data.

According to the first embodiment, even if the density of the background for rendering the character data is high and the density of the character data is low (for example, a white character), jaggies generated at the edge sections of the pseudo-halftone image can be appropriately corrected, and high image quality of the print result can be attained.

[Second Embodiment]

Figure 13:
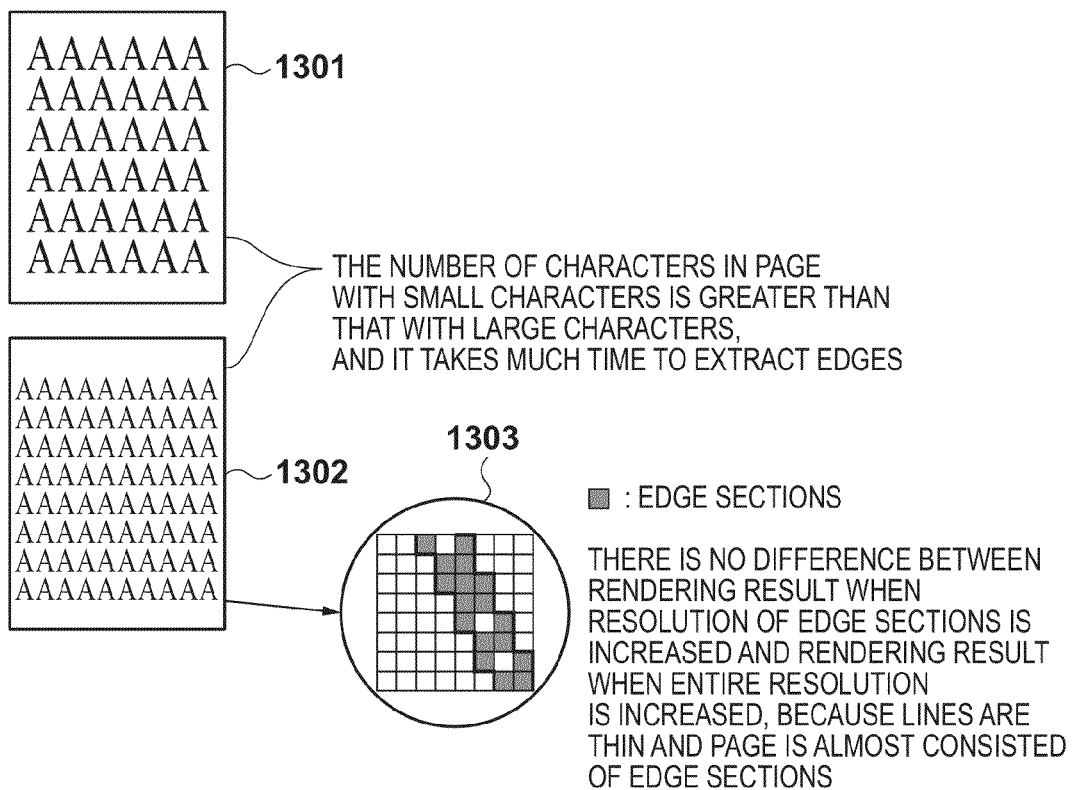
FIG. 13 is a diagram for explaining a problem according to a second embodiment.
Figure 14:
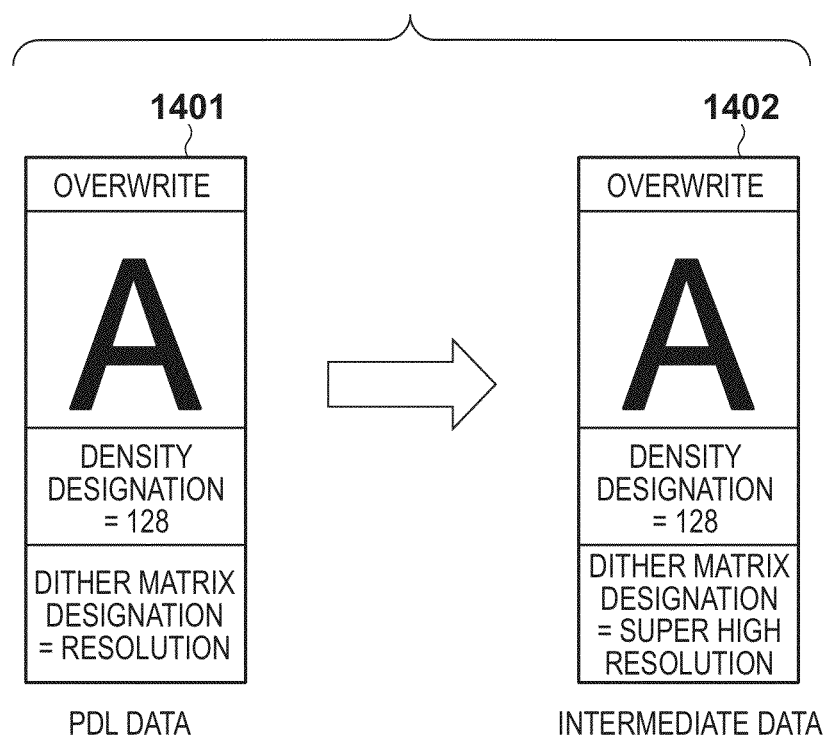
FIG. 14 is a diagram showing an example of replacing a resolution of PDL data with a super high resolution.
Figure 15:
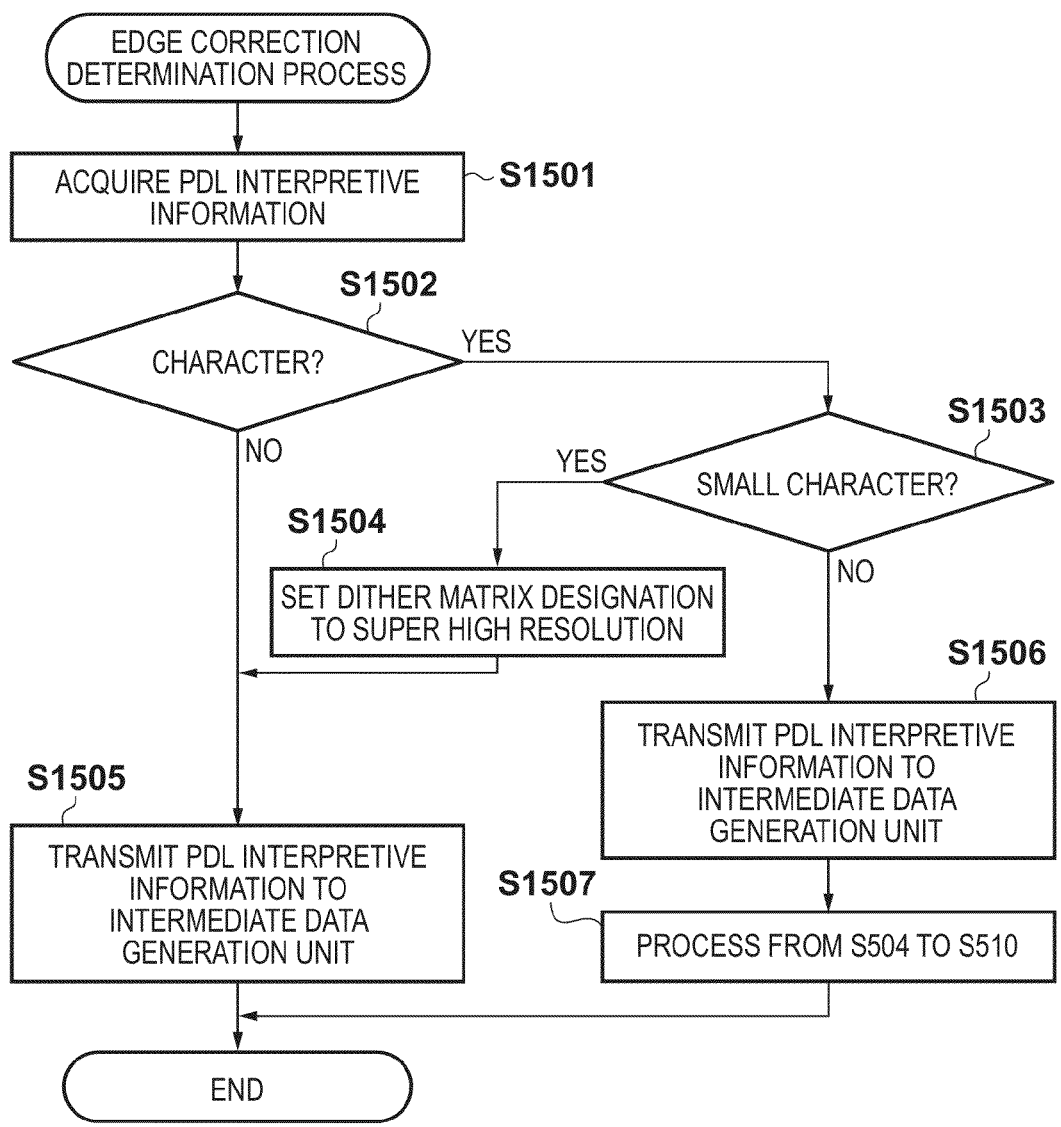
FIG. 15 is a flow chart showing an edge correction determination process according to the present embodiment.

A second embodiment will be described in detail with reference to FIGS. 13 to 15. PDL data that obtains a print result 1301 shown in FIG. 13 has few characters. Therefore, the time it takes to generate the intermediate data for edge correction (mainly generate the character edge mask image) is short, and the entire processing speed is not reduced. Meanwhile, PDL data that obtains a print result 1302 has many characters. Therefore, the time it takes to generate the intermediate data for edge correction is long, and the entire processing speed may be reduced. A characteristic that the size of the characters of the PDL data that obtains a print result 1303 is smaller than a predetermined size is used to improve the situation. In this way, if the size of the characters is smaller than the predetermined size, most of the sections of the characters are edge sections. Therefore, there is no difference between the character mask image and the character edge mask image.

More specifically, if the characters are small, only the dither matrix designation is replaced by the dither matrix with a high number of lines, without creating the character edge mask image. In PDL data 1401 of FIG. 14 that shows an example of the intermediate data, only the dither matrix designation is replaced by the dither matrix with a high number of lines (from resolution to super high resolution) in intermediate data 1402.

A process by the edge correction determination unit 304 applying the second embodiment will be described with reference to FIG. 15. A program of the edge correction determination unit 304 is stored in the RAM 105 or the external memory 113. The program is loaded on the RAM 105 upon execution, and the CPU 104 executes the program.

The edge correction determination unit 304 receives the PDL interpretive information from the PDL interpretation unit 303 (S1501). The edge correction determination unit 304 determines whether the information indicates a character (S1502). If the information indicates a character, the edge correction determination unit 304 further determines whether the character is a small character (character in a smaller size than a predetermined size) (S1503). If the character is a small character (character in a smaller size than the predetermined size), the edge correction determination unit 304 replaces only the dither matrix designation of the PDL interpretive information (S1504) and transmits the PDL interpretive information to the intermediate data generation unit 306 (S1505).

On the other hand, if the character is not a small character, the edge correction determination unit 304 transmits the PDL interpretive information to the intermediate data generation unit 306 without changing the PDL interpretive information (S1506) and generates intermediate data for edge correction in S1507. S1507 is the same process as S504 to S510 of FIG. 5, and the description will not be repeated.

Whether the information indicates a line may be determined in S1502, and the process of S1504 and S1505 may be executed if it is determined that the information indicates a line.

According to the second embodiment, even if the size of the character included in the PDL data is small, jaggies caused by the pseudo tone formation at the edge sections of the character in the first embodiment can be suppressed without reducing the processing speed.

[Third Embodiment]

Figure 16A:
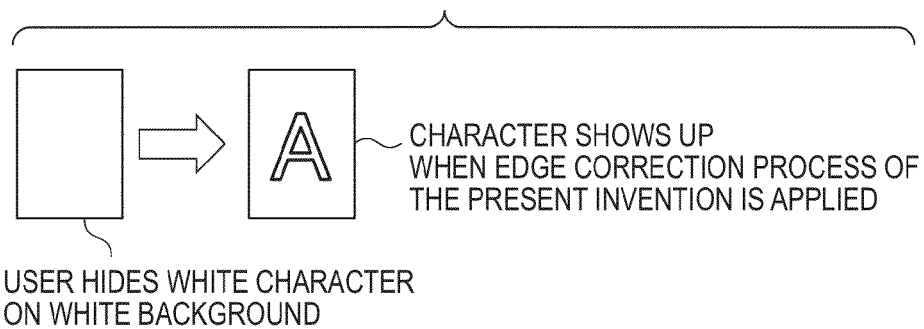
FIGS. 16A to 16C are diagrams for explaining a problem according to a third embodiment.

A third embodiment will be described in detail with reference to FIGS. 16A to 18. As shown in FIG. 16A, there is a case of writing a white character on a white background to prevent the character from being reflected on the print result. This is often performed when the user attempts to prevent other people from viewing high-security characters and texts on an application. In that case, there is a problem that the character hidden by the user can be seen when the edges of the character are corrected. To improve the problem, the rendering processing unit 308 refers to the background to switch whether to execute the rendering process for edge correction process. However, the background cannot be simply determined when pseudo-tone image data is created.

Figure 16B:
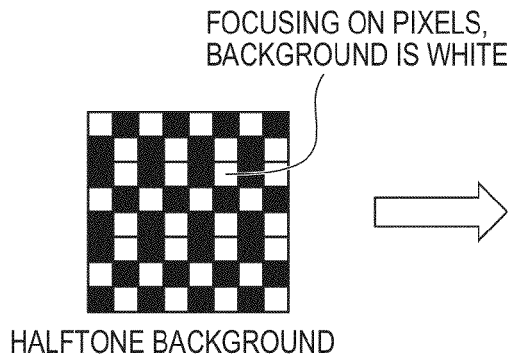
Figure 16C:
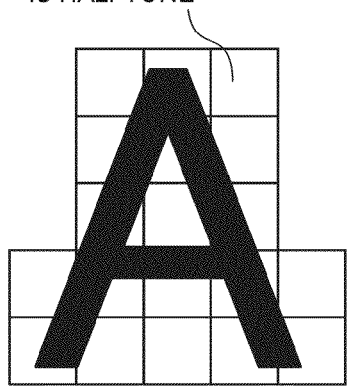

This is because as shown in FIG. 16B, the background is determined to be white if the pseudo-tone image data is viewed pixel by pixel. Therefore, when the background is determined in the pseudo-tone image data, the background needs to be determined small area by small area as in FIG. 16C, not pixel by pixel.

A process by the rendering processing unit 308 performing the white background determination area by area and switching whether to execute a rendering process for edge correction process will be described with reference to FIG. 18. A program of the rendering processing unit 308 and the pseudo halftone formation unit 309 is stored in the RAM 105 or the external memory 113. The program is loaded on the RAM 105 upon execution, and the CPU 104 executes the program. If the rendering processing H/W 102 that executes the process is included, the rendering processing H/W 102 may execute the process.

Figure 17:
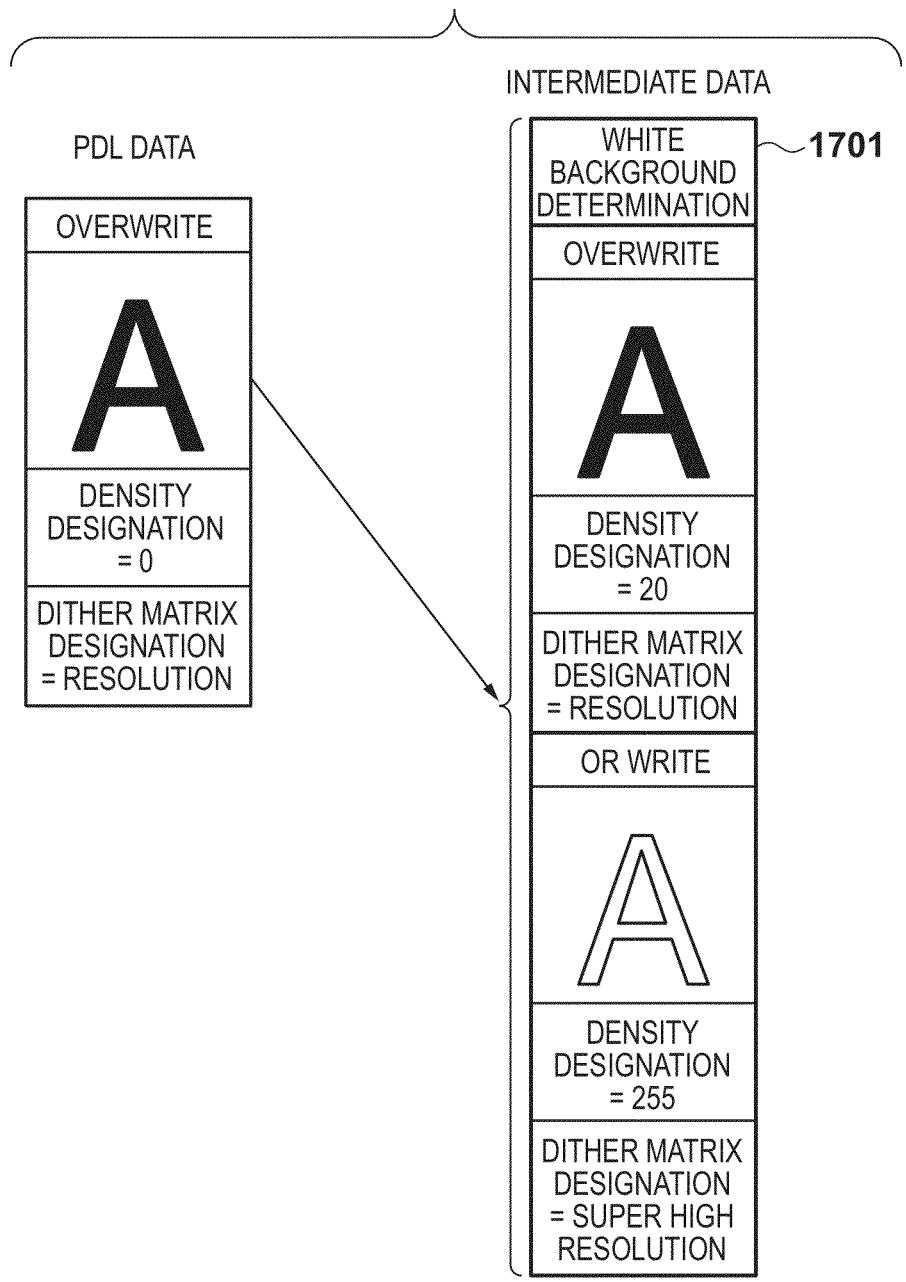
FIG. 17 is a diagram for explaining white background determination of intermediate data.

If the character is a white character, a white background determination command 1701 is added to the intermediate data as shown in FIG. 17. If there is the white background determination command 1701, the rendering processing unit 308 determines to perform the white background determination (S1801). The rendering processing unit 308 performs the white background determination area by area and stores the result in the RAM 105 (S1802). The same process as S901 to S905 of FIG. 9 is executed in S1803 to S1807.

In S1807, the rendering processing unit 308 performs OR write of the pseudo-halftone image data for edge correction in the image data memory 310. However, the OR write is not performed in areas determined to be a white background as a result of reading the white background determination result of S1802 from the RAM 105.

The print result of the PDL data in which a white character is rendered on a white background is output in a state of a blank sheet. If the first embodiment is simply applied to the PDL data, the print result may not be the blank sheet, but may be a fraudulent result in which edge sections of the character are rendered. However, the application of the third embodiment can attain a normal result in which the edges of the character are not rendered.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-108734 filed May 13, 2011 and 2012-088782 filed Apr. 9, 2012, which are hereby incorporated by reference herein in their entirety.

What is claimed is:

1. An image processing apparatus comprising:
a generation unit that generates first intermediate data from print data and generates character edge data serving as second intermediate data by extracting edge sections of a character from the print data;
a processing unit that applies a rendering process to the first intermediate data, applies a first halftone process using a dither matrix with a first number of lines to data after the rendering process to generate a first halftone image, applies a rendering process to the second intermediate data, and applies a second halftone process using a dither matrix with a second number of lines greater than the first number of lines to data after the rendering process to generate a second halftone image; and
an output unit that outputs a halftone image obtained by an OR operation of the first halftone image and the second halftone image,
wherein the character edge data is data obtained by extracting inside lines of the edge sections of the character in a case where a density of the character is equal to or greater than a predetermined density.

2. The apparatus according to claim 1, wherein the character edge data is data obtained by extracting a character included in the print data and extracting outside lines of the edge sections of the character in a case where a density of the character is smaller than the predetermined density.

3. The apparatus according to claim 1, wherein the print data is PDL data.

4. The apparatus according to claim 1, wherein the first intermediate data and the second intermediate data are display lists.

5. The apparatus according to claim 1, further comprising:
a unit that determines whether a background of the character is a white background if the character edge data indicates a white character,
wherein the processing unit does not execute the processes in a case where the background is determined to be a white background.

6. The apparatus according to claim 5, wherein the determination unit determines whether the background of the character is a white background area by area, not pixel by pixel.

7. An image processing apparatus comprising:
a generation unit that generates first intermediate data from print data and generates character edge data serving as second intermediate data by extracting edge sections of a character from the print data;
a processing unit that applies a rendering process to the first intermediate data, applies a first halftone process using a dither matrix with a first number of lines to data after the rendering process to generate a first halftone image, applies a rendering process to the second intermediate data, and applies a second halftone process using a dither matrix with a second number of lines greater than the first number of lines to data after the rendering process to generate a second halftone image;
an output unit that outputs a halftone image obtained by an OR operation of the first halftone image and the second halftone image; and
a determination unit that extracts a character included in the print data and determines whether a size of the extracted character is smaller than a predetermined size,
wherein in a case where the size of the extracted character is greater than the predetermined size as a result of the determination by the determination unit, the generation by the generation unit, the processes by said processing unit, and the output by the output unit are performed.

8. The apparatus according to claim 7, wherein in a case where the size of the extracted character is smaller than the predetermined size as a result of the determination by the determination unit, the second intermediate data is not generated, and a third halftone process using a dither matrix with a third number of lines greater than the first number of lines is applied to the data obtained by applying the rendering process to the first intermediate data.

9. A processing method of an image processing apparatus, the method comprising:
generating first intermediate data from print data and generating character edge data serving as second intermediate data by extracting edge sections of a character from the print data;
applying a rendering process to the first intermediate data, applying a first halftone process using a dither matrix with a first number of lines to data after the rendering process to generate a first halftone image, applying a rendering process to the second intermediate data, and applying a second halftone process using a dither matrix with a second number of lines greater than the first number of lines to data after the rendering process to generate a second halftone image; and
outputting a halftone image obtained by an OR operation of the first halftone image and the second halftone image, wherein the character edge data is data obtained by extracting inside lines of the edge sections of the character in a case where a density of the character is equal to or greater than a predetermined density.

10. A non-transitory computer-readable recording medium recording a program for causing a computer to execute the processing method of the image processing apparatus according to claim 9.

* * * * *